United States Patent
Masuda et al.

(10) Patent No.: US 12,434,963 B2
(45) Date of Patent: Oct. 7, 2025

(54) HYDROGEN GAS PRODUCING APPARATUS USING A PHOTOCATALYST

(71) Applicants: TOYOTA JIDOSHA KABUSHIKI KAISHA, Toyota (JP); TOYODA GOSEI CO., LTD., Aichi (JP)

(72) Inventors: Taizo Masuda, Yokohama (JP); Ryota Tomizawa, Mishima (JP); Kenichi Okumura, Gotemba (JP); Tatsuya Hasegawa, Ama (JP)

(73) Assignees: TOYOTA JIDOSHA KABUSHIKI KAISHA, Toyota (JP); TOYODA GOSEI CO., LTD., Kiyosu (JP)

( * ) Notice: Subject to any disclaimer, the term of this patent is extended or adjusted under 35 U.S.C. 154(b) by 555 days.

(21) Appl. No.: 17/988,820

(22) Filed: Nov. 17, 2022

(65) Prior Publication Data

US 2023/0202837 A1    Jun. 29, 2023

(30) Foreign Application Priority Data

Dec. 23, 2021    (JP) ................................. 2021-210009

(51) Int. Cl.
  *C01B 3/04*    (2006.01)
(52) U.S. Cl.
  CPC ...... *C01B 3/042* (2013.01); *C01B 2203/0277* (2013.01); *C01B 2203/1041* (2013.01)
(58) Field of Classification Search
  None
  See application file for complete search history.

(56) References Cited

FOREIGN PATENT DOCUMENTS

| | | |
|---|---|---|
| CN | 204503051 U | 7/2015 |
| EP | 3 981 738 A1 | 4/2022 |
| JP | H09-142804 A | 6/1997 |
| JP | H09-510657 A | 10/1997 |
| JP | 2003-251197 A | 9/2003 |
| JP | 2013-234077 A | 11/2013 |
| JP | 2015-218103 A | 12/2015 |
| JP | 2016-108181 A | 6/2016 |

(Continued)

OTHER PUBLICATIONS

Lin, H Y et al: "Photocatalytic hydrogen production with nickel oxide intercalated K4Nb6O17 under visible light rradiation", International Journal of Hydrogen Energy 33, (2008), pp. 4055-4063.

(Continued)

*Primary Examiner* — Colin W. Slifka
(74) *Attorney, Agent, or Firm* — Oliff PLC

(57) ABSTRACT

In an apparatus producing hydrogen gas by a decomposition reaction of water using a photocatalyst, the water is warmed with waste heat of a light source for improving the production efficiency of hydrogen gas. The hydrogen gas producing apparatus 1 comprises a container portion receiving water; a photocatalyst body, dispersed or placed in the water, having a photocatalyst material to generate excited electrons and electron holes by irradiation of light, causing the decomposition reaction of water which decomposes water into hydrogen and oxygen to generate hydrogen gas; a light source emitting the light to be irradiated to the photocatalyst body; and a housing carrying the light source; wherein the housing is placed in the water, which is warmed by the waste heat of the light source discharged from the housing surface which is coated with a photocatalyst material.

10 Claims, 4 Drawing Sheets

(56) References Cited

FOREIGN PATENT DOCUMENTS

| JP | 2017-24956 A | 2/2017 |
|----|---|---|
| WO | 9606675 A1 | 3/1996 |
| WO | 2006/020448 A2 | 2/2006 |

OTHER PUBLICATIONS

Kete, Marko et al: "Design and evaluation of a compact photocatalytic reactor for water treatment", Environ Sci Pollut Res (2018), 25 pp. 20453-20465.

"Photocatalytic water splitting with a quantum efficiency of almost unity" Tsuyoshi Takata, Junzhe Jiang, Yoshihisa Sakata, Mamiko Nakabayashi, Naoya Shibata, Vikas Nandal, Kazuhiko Seki, Takashi Hisatomi & Kazunari Domen, Nature vol. 581, pp. 411-414 (2020).

HYDROGEN GAS PRODUCING APPARATUS USING A PHOTOCATALYST

CROSS-REFERENCE TO RELATED APPLICATION

This application claims priority to Japanese Patent Application No. 2021-210009 filed on Dec. 23, 2021, which is incorporated herein by reference in its entirety including the specification, drawings, and abstract.

TECHNICAL FIELD

The present invention relates to a hydrogen gas producing apparatus, and more specifically to an apparatus which manufactures hydrogen gas by the decomposition reaction of water using a photocatalyst.

BACKGROUND ART

Hydrogen gas is expected to be used as clean, next-generation fuel generating no carbon dioxide in its combustion. Since hydrogen gas can be produced by a decomposition reaction of water induced by a photocatalyst with light energy, various techniques for the production of hydrogen gas using a photocatalyst have been proposed. For instance, in Japanese Laid-open Patent Publication No. H09-510657 and Japanese Laid-open Patent Publication No. 2003-251197, there are disclosed photocatalysts inducing a decomposition reaction of water by irradiation of ultraviolet light or visible light to generate hydrogen gas and their preparing methods. Japanese Laid-open Patent Publication No. 2013-234077 discloses a structure of a hydrogen production apparatus including a water oxidation reaction means using a photocatalyst with ultraviolet to visible light in the sunlight and a water reduction reaction means using heat of visible to infrared light in the sunlight. Japanese Laid-open Patent Publication No. 2015-218103 has proposed a structure of a hydrogen generation device in which water with dispersed photocatalyst particles is circulated in a housing having a light-receiving window so that a water decomposition reaction to generate hydrogen gas will be caused by light. Japanese Laid-open Patent Publication No. 2017-24956 has proposed a structure of a hydrogen generation system in which a receiver, having an electrode consisting of a photocatalyst placed in water, is irradiated with light accumulated by means of a sunlight condenser so that valence electrons in the photocatalyst will be excited to cause electrolysis of its surrounding water and produce hydrogen gas continuously. In this regard, in Japanese Laid-open Patent Publication No. 2016-108181, although not a technique for production of hydrogen gas, it has been disclosed that methane is generated with the generation of carbon monoxide by immersing a plate carbon material composed of carbon allotrope of sp3 crystal structure into a solvent in which carbon dioxide is dissolved and irradiating the solvent with ultraviolet light while raising its temperature by a heater to excite the carbon material so that the C═O bond of the carbon dioxide will be broken.

SUMMARY

Technical Problem

By the way, according to the research of inventors of the present embodiment, it has been found out that the production efficiency of hydrogen gas becomes higher as the temperature of water, which is a reactant, becomes higher. Thus, the warming of water is effective for raising the efficiency of the production of hydrogen gas, and in that case, if the waste heat of a light source which generates light irradiated to a photocatalyst can be used without using any separate heater to which energy is supplied from the outside, more concretely, if a structure in which, as well as the radiant heat from the light source to the water, the waste heat of the light source can be transferred directly to the water is employed, it will also become possible to improve more the utilization efficiency of energy in connection with the hydrogen gas production. As one of such structures, there can be considered a structure that water is made in contact with the surface of a heat-generating light source device by placing its housing which carries a light source in the water. In this respect, according to the research of the inventors of the present invention, there was observed a phenomenon that, when the surface of a housing of a light source is formed with materials, such as metal, for improvement in the heat transfer efficiency, the metal material on the housing surface was eluted into water and thus the housing surface was deteriorated. Accordingly, in the structure in which a housing carrying a light source is placed in water, it is preferable that deterioration of a surface of the housing is suppressed while the reduction of its heat transfer efficiency is also suppressed as low as possible, and in that case, a structure that improves the light reaction amount of water is advantageous.

Thus, one of the objects of the present embodiment is to provide an apparatus of producing hydrogen gas by the decomposition reaction of water using a photocatalyst, which apparatus has a structure in which water is warmed by waste heat of a light source for improving the efficiency of the hydrogen gas production.

Further, another object of the present embodiment is to provide such an apparatus having a structure in which a light source, together with a housing carrying it, is sunk in water, wherein degradation of the surface of the housing can be suppressed and simultaneously the light reaction amount of the water can also be increased.

Solution to Problem

According to one manner of the present embodiment, the above-mentioned object is achieved by a hydrogen gas producing apparatus, comprising:
a container portion which receives water;
a photocatalyst body, dispersed or placed in the water in the container portion, which has a photocatalyst material, which, when it is irradiated with light, generates excited electrons and electron holes, causing a water decomposition reaction in which water is decomposed into hydrogen and oxygen thereby generating hydrogen gas;
a light source emitting light which is irradiated to the photocatalyst body and causes the water decomposition reaction; and
a housing carrying the light source;
wherein the housing is placed in the water in the container portion so that the water is warmed by waste heat of the light source discharged from the surface of the housing, and the surface of the housing in contact with the water is coated with a photocatalyst material.

In the above-mentioned structure, the "photocatalyst material" may be a material which can cause the decomposition reaction of water to reduce water and generate hydrogen gas when it is irradiated with light as noted above. The "photocatalyst body" is composed of the photocatalyst material, which may be particles dispersed in the water, a member made of the photocatalyst material itself, or an arbitrary substrate fixed with the photocatalyst material thereon, placed at an arbitrary position in the water, or both of them (Hereinafter, in this specification, when "a photocatalyst" is referred to simply, a photocatalyst material is indicated.). The "light source" may be an arbitrary form of emitting light, which is absorbed by the photocatalyst material and causes the decomposition reaction of water, typically by receiving the supply of electric power, and the light source is carried by the housing and placed in the water while being waterproofed together with the housing. Preferably, the housing is to be formed of a material with high thermal conductivity, and typically, the housing may be formed of a metal material, such as aluminum.

The emission wavelength of the light source is chosen so that the light irradiated to the photocatalyst will be efficiently absorbed into the photocatalyst to generate excited electrons and electron holes, and preferably so as to fall in a wavelength band in which the quantum yield of the photocatalyst exceeds a predetermined threshold value (chosen arbitrarily). In this respect, as illustrated in the column of embodiment in the following, the quantum yield of a typical photocatalyst rapidly increases when the wavelength of the irradiated light is below the vicinity of a certain wavelength. Thus, the light source may be chosen so that the emission wavelength of the light source will be in the shorter side than the wavelength at which the rapid increase of the quantum yield of the photocatalyst occurs. For the photocatalyst which can be used in the present embodiment, for instance, $SrTiO_3$ (strontium titanate), $La_2Ti_2O_7$ (lanthanum titanate), $Ga_2O_3$ (gallium oxide), GaN (gallium nitride), $NaTaO_3$ (sodium tantalate), $TiO_2$ (titanium oxide), etc. are usable. In this regard, these photocatalysts may be used while a co-catalyst is added appropriately. On the other hand, for the light source, various light emission diodes (LED) may be employed, and concretely, those using indium gallium nitride (InGaN), diamond (ultraviolet), gallium nitride (GaN)/aluminum gallium nitride (AlGaN) (ultraviolet, blue), zinc selenide (blue), zinc oxide (near-ultraviolet, purple, blue) are usable.

And in the structure of the apparatus of the present embodiment, the surface of the housing in contact with the water is coated with a photocatalyst material. Here, the photocatalyst material coated on the housing surface may be a material identical to, or different material from, that of the photocatalyst body. Thereby, the direct contact of the surfaces of metal material, etc. defining the housing with water is avoided.

In the structure of the above-mentioned apparatus of the present embodiment in which the decomposition reaction of water is caused by irradiating with the light the photocatalyst body in contact with water to produce hydrogen gas, there is provided the structure of warming water by the waste heat of the light source by sinking in the water the light source carried by the housing. According to this structure, the efficiency of hydrogen gas production will be improved because the water, which is a reactant, is warmed. Further, since the warming of the water is achieved using the waste heat of the light source, no heater for warming water, etc. is needed to be prepared separately, and therefore, since it is not necessary to supply energy for warming water separately, the increase in efficiency of the energy used in the hydrogen gas production will be attained. Then, in the case of the present embodiment, the surface of the housing sunk in the water is coated with a photocatalyst material, and thereby, when the housing is made of the metal material, etc., the metal of the housing surface is prevented from being in contact with water directly, so that the dissolution of the metal on the housing surface will be prevented and thereby the deterioration of the housing surface will be suppressed. In this respect, the light emitted from the light source in the water propagates in various directions in the water because of scattering in various ways (Rayleigh scattering, Raman scattering, etc.) and reflection on inner walls of the container portion and the water surface. So, when the scattered or reflected light strikes upon the photocatalyst of the housing surface of the light source, the light is absorbed therein, causing the decomposition reaction of water on the housing surface, and thereby the further improvement in the efficiency of hydrogen gas production is expected. Furthermore, according to the above-mentioned structure, since the light source is placed in the container portion and the configuration of the outside of the container portion is simplified, the space required for the placing of the apparatus can be made compact, and thus, it becomes easy to increase the size of the container portion, scaling up the apparatus.

In the above-mentioned apparatus of the present embodiment, there may be provided a structure in which the light emitted from the light source is irradiated also to the photocatalyst material coated on the housing surface in an arbitrary manner. For instance, the apparatus of the present embodiment may be designed such that two or more light sources and housings carrying these light sources are placed in the water in the container portion and the light being emitted from one of the light sources is irradiated to the photocatalyst material coated on the surface of the housing of another of the light sources also. Moreover, in another manner, the apparatus of the present embodiment may be designed such that the light emitted from the light source is confined in the container portion, and for this, for instance, the container portion may have a light reflecting mechanism for confining the light emitted from the light source in the container portion by providing a light reflecting board on the inner side of the container portion. According to these structures, as much amount as possible of the light emitted from the light source is irradiated to the photocatalyst, and can contribute to generating hydrogen gas.

By the way, according to the research of the inventors of the present embodiment, as explained in detail in the column of embodiments later, it has been found that the production efficiency of hydrogen gas (the produced amount of hydrogen gas per incident light amount) decreases as the density of the light irradiated to the photocatalyst is increased. This is considered because, even when the densities of excited electrons and electron holes generated in the photocatalyst are increased by the increase of the light intensity, the speed of the decomposition reaction of water with the excited electrons and electron holes is slow, and thus, the excited electrons and electron holes will disappear due to their recombination before those react to water, respectively, and accordingly, the energy of the light is not effectively used for the production of hydrogen gas. So, it is preferable that the density of the light emitted from the light source is adjusted to be an appropriate value while being balanced with the decrease in the production efficiency of hydrogen gas. Then, in the above-mentioned apparatus of the present embodiment, the density of the light irradiated to the photocatalyst body may be adjusted at, or lower than, the density at which a photocatalyst efficiency (a ratio of the generated amount of hydrogen gas per the amount of photons incident on the photocatalyst material) becomes more than a predetermined value. Concretely, for instance, according to an experiment, since it has been found that it is preferable that the density of light irradiated to a photocatalyst body is made at or lower than 0.1 W/cm², it is preferable that the relation between the output P of a light source and the irradiated area A is to be adjusted so that the output of the light source P/the irradiated area A 0.1 W/cm² will be established.

In the above-mentioned apparatus of the present embodiment, the light source may be configured to operate with electric power obtained by solar power generation and emit the light to be irradiated to the photocatalyst body and the waste heat in the operation of the light source may be transmitted to water from the housing. Thereby, the production of hydrogen gas will be achieved by renewable energy. Moreover, according to operating a light source with electric power obtained from sunlight, instead of irradiating the photocatalyst body with the sunlight itself, it becomes possible to supply the light energy to the photocatalyst body while condensing the solar energy which is thin per unit area, attaining the miniaturization of the apparatus.

By the way, in the operating of the light source with electric power, it is preferable that the light-emitting efficiency of the light source is maximized. Thus, in the operating of the light source with electric power obtained by the solar power generation, the rated output of the light source may be adjusted so that the light-emitting efficiency of the light source will be maximized when the current at the rated current value of the solar power generation is supplied to the light source. Thereby, the solar energy can be more efficiently used for the production of hydrogen gas. Further, in the case of the solar power generation, its output is changed depending upon the sunshine condition, and thus, the available current can change moment by moment. In that case, the efficiency of the energy used in the production of hydrogen gas will be improved when the light source is operated moment by moment so that its light-emitting efficiency will be maximized. In this respect, two or more LEDs may be employed as the light source, and in that case, since the light-emitting efficiency of each LED changes depending upon the current inputted into it, the light source may be designed so that the number of the actually operating LEDs in the two or more LEDs will be changed according to the output current of the solar power generation so as to maximize the light-emitting efficiency of the light source. Thereby, it is expected that solar energy is more effectively converted into the light from the light source to be used for the production of hydrogen gas.

Effect of Invention

Thus, according to the present embodiment as described above, in the production of hydrogen gas through the decomposition reaction of water using a photocatalyst, when the temperature of the water, which is the reactant, is raised for improvement in a photocatalyst efficiency, the light source is sunk in the water together with its housing, and thereby the waste heat of the light source is discharged from the housing so that the rise of the water temperature will be attained, and further, by coating the surface of the housing with a photocatalyst material, the surface of the housing is protected from the deterioration by water, and simultaneously, since some components in the light emitted from the light source propagate in various directions because of scattering or reflection in the water and strike upon the photocatalyst on the housing surface, it becomes possible that these light components are also made contribute to the production of hydrogen gas, improving the energy efficiency thereof. Furthermore, if the metal surface of the housing is directly in contact with water and thereby the metal material thereon dissolves into water, the metal ions dissolved in the water would react with excited electrons or electron holes generated in the photocatalyst in the water, which could decrease the production efficiency of hydrogen gas. However, in the present embodiment, since the elution of the metal material on the housing surface is prevented, the decrease of the production efficiency of hydrogen gas due to the metal ions can be suppressed. Moreover, according to the structure that warms water by the waste heat of the light source, the water temperature will be more surely raised than in a case of warming water by the radiant heat of the light source, and thus, further improvement in the photocatalyst efficiency is expected. And in the case of the manner of operating the light source of the apparatus of the present embodiment with electric power of solar energy origin, it becomes possible to obtain hydrogen energy efficiently without carbon dioxide emission.

Other purposes and advantages of the present inventions will become clear by explanations of the following preferable embodiments of the present invention.

BRIEF DESCRIPTIONS OF DRAWINGS

FIG. 1A is a schematic drawing of a hydrogen gas producing apparatus according to the present embodiment. FIG. 1B is a typical side view of a light source device thereof.

FIG. 2 is a drawing which shows examples of the wavelength characteristics of the absorbance and quantum yield of a typical photocatalyst ($SrTiO_3$) used for a hydrogen gas producing apparatus in accordance with the present embodiment (quoted from "Photocatalytic water splitting with a quantum efficiency of almost unity" Tsuyoshi Takata, Junzhe Jiang, Yoshihisa Sakata, Mamiko Nakabayashi, Naoya Shibata, Vikas Nandal, Kazuhiko Seki, Takashi Hisatomi & Kazunari Domen, Nature volume 581, pages 411-414 (2020)), and the emission wavelength characteristic of a light source (InGaN series LED) (measured by the inventors of the present embodiment).

FIG. 3A is a graph chart showing a variation of a photocatalyst efficiency to a temperature in water which the photocatalyst is in contact with, obtained experimentally. FIG. 3B is a graph chart showing a variation of a photocatalyst efficiency to the density (light intensity) of light irradiated to a photocatalyst. Data were obtained by experiments by the inventors of the present embodiment.

Figure 6A:
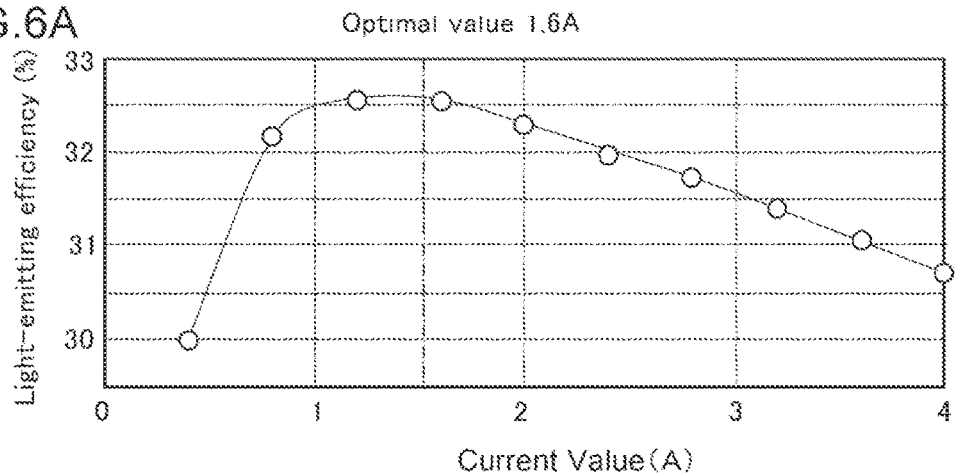
Figure 6B:
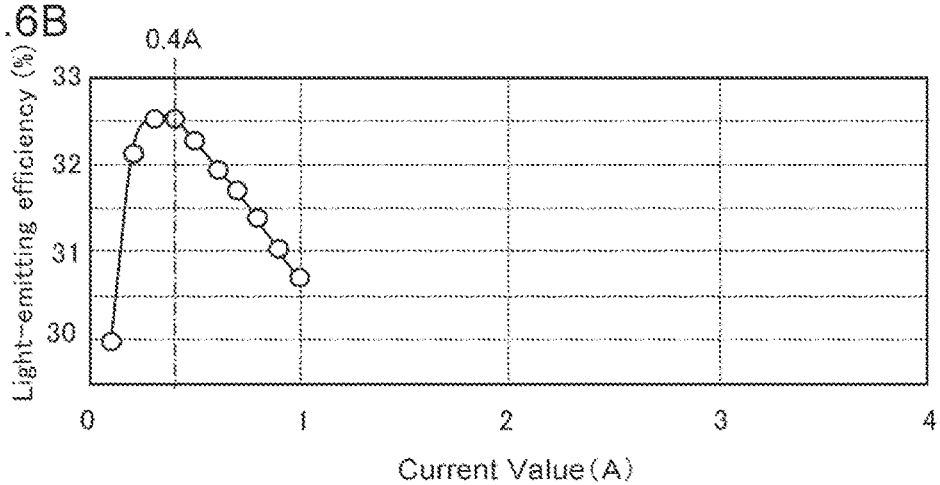

FIG. 6A is a graph chart showing a variation of a light-emitting efficiency to a current inputted to a light source in which four LEDs were connected in parallel to an electric source, obtained experimentally. FIG. 6B is a graph chart showing a variation of a light-emitting efficiency to a current inputted to a light source in which one LED was connected in parallel to an electric source. Data were obtained by experiments by the inventors of the present invention.

Figure 7A:
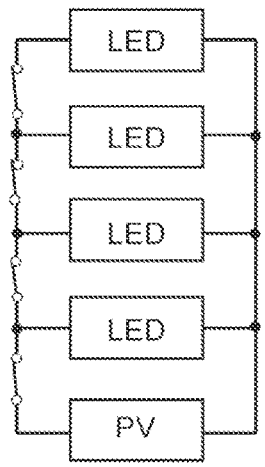
Figure 7B:
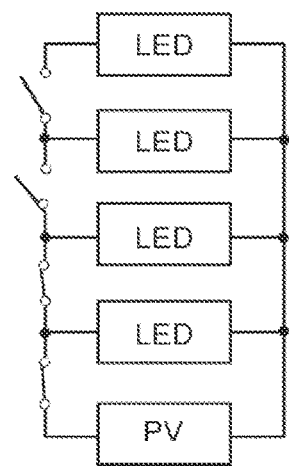
Figure 7C:
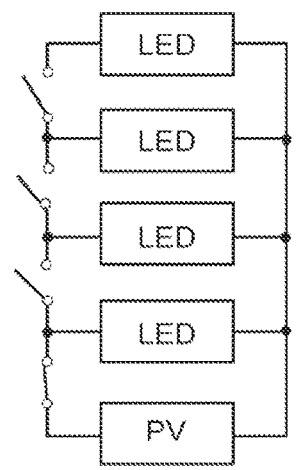

FIGS. 7A-7C are drawings showing schematically circuit structures of a light source in which the number of operated LEDs can be changed according to the amount of a generated current of a solar panel.

DESCRIPTIONS OF EMBODIMENTS

The Structure of Hydrogen Gas Producing Apparatus

Figure 1A:
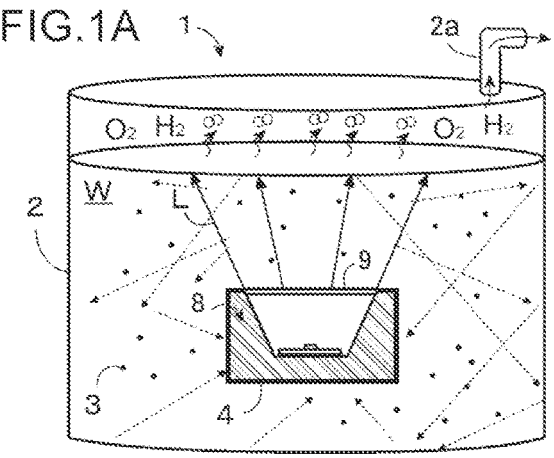

Referring to FIG. 1A, in one manner, a hydrogen gas producing apparatus 1 of the present embodiment has a container portion 2 of an arbitrary form which receives water (liquid) W, particulate photocatalyst bodies 3 consisting of a photocatalyst material and dispersed in the water in the container portion 2, a light source device 4 which emits light to be irradiated to the photocatalyst bodies 3, and an gas pipe 2a which sends discharged hydrogen gas and oxygen gas to a separator (not shown).

Figure 2:
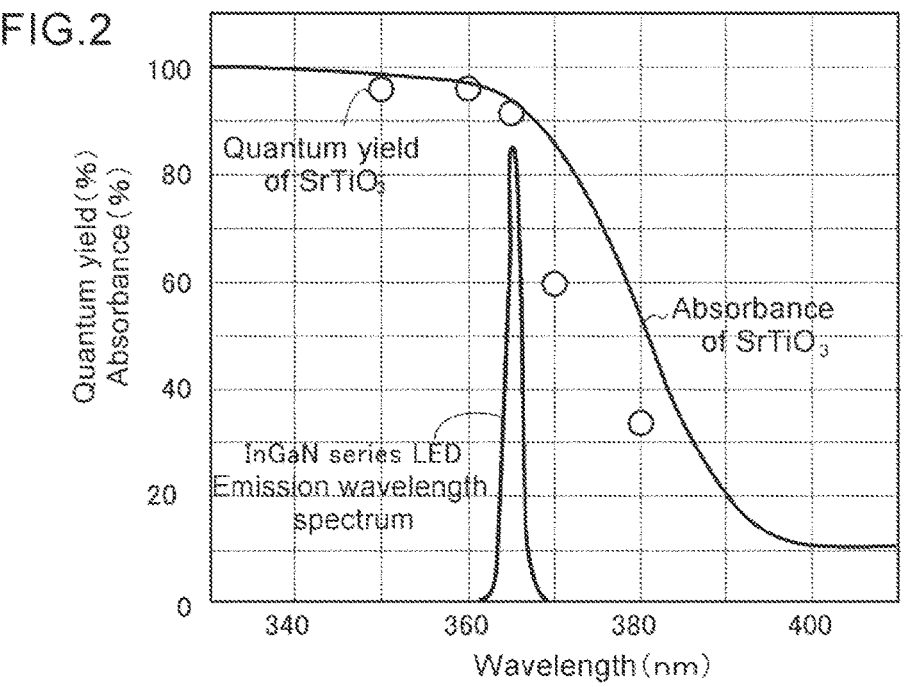

In the structure of the above-mentioned hydrogen gas producing apparatus 1, the photocatalyst bodies 3 are particles consisting of a photocatalyst material, which can absorb photons, when irradiated with light, and generate excited electrons and electron holes, causing the decomposition reaction of water to generate hydrogen gas by reducing water, and the particles may be dispersed in the water. For the photocatalyst material used in this embodiment, a material which can generate hydrogen gas from water by the irradiation of light, used in this field, may be employed, and concretely, for example, $SrTiO_3$ (strontium titanate), $La_2Ti_2O_7$ (lanthanum titanate), $Ga_2O_3$ (gallium oxide), GaN (gallium nitride), $NaTaO_3$ (sodium tantalate), $TiO_2$ (titanium oxide), etc., are usable. As shown in FIG. 2, typically, a photocatalyst material exhibits a wavelength characteristic that its absorbance and quantum yield rapidly increase near a certain wavelength as the wavelength of irradiated light changes from the long wavelength side to the short wavelength side (The generated amounts of excited electrons and electron holes by absorption of photons increase in the wavelength band where the absorbance and quantum yield increase.). In the preparation of such particulate photocatalyst bodies 3 from a photocatalyst material, semiconductor particles consisting of a photocatalyst material are formed by mixing and calcining source materials of compositions forming the photocatalyst material, and these particles may be dispersed in water as the photocatalyst bodies 3. In this regard, as the photocatalyst bodies 3, although the semiconductor particles consisting of the above-mentioned photocatalyst material may be used directly, there may be used particles to which an appropriately selected co-catalyst is added on the particle surfaces to reinforce their catalytic ability.

The light source device 4 may be an arbitrary light source emitting the light of a wavelength which is absorbed by the photocatalyst material of the above-mentioned photocatalyst bodies 3 to make the photocatalyst material generate excited electrons and electron holes. In this respect, more in detail, as shown in FIG. 2, since the photocatalyst material has the wavelength characteristics of the absorbance and quantum yield which increase when the photocatalyst material is irradiated with the light of a wavelength in the shorter side than a certain wavelength, there is selected, in the light source device 4, a light emitting element or a light-emitting object which generates the light in the wavelength band in which the absorbance and quantum yield of the photocatalyst material of the photocatalyst bodies 3 increase. Concretely, for the light emitting element or light-emitting object of the light source, there may be employed various light emission diodes (LEDs) using such as indium gallium nitride (InGaN), diamond (ultraviolet), gallium nitride (GaN)/aluminum gallium nitride (AlGaN) (ultraviolet, blue), zinc selenide (blue), zinc oxide (near-ultraviolet, purple, blue). For instance, in a case that $SrTiO_3$ is used as the photocatalyst material of FIG. 2, since the absorbance and quantum yield will increase when the wavelength of the irradiated light is less than 380 nm, the LED of InGaN series which has a peak of an emission wavelength in 360-370 nm can be used advantageously as the light-emitting object of the light source device 4.

Figure 1B:
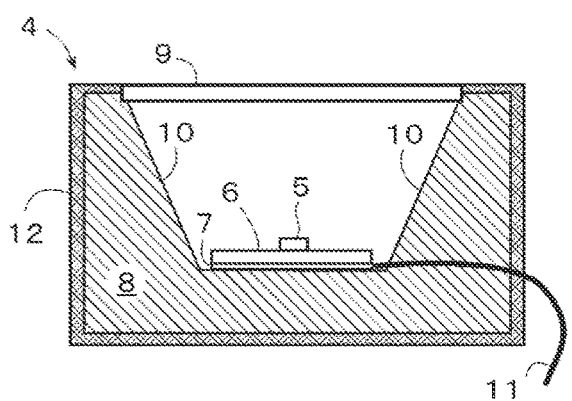

As schematically drawn on FIG. 1B, for instance, the light source device 4 is configured such that a light source 5, which may be LED, is placed on a printed circuit board 6, under which a heat conduction sheet is laid, and placed in a concave structure of a housing 8. The housing 8 may be formed of an arbitrary material with high thermal conductivity, such as metal, e.g., aluminum, etc. And, an opening portion of the concave structure of the housing 8, in which the light source 5 is placed, is closed and sealed by a transparent plate 9 with a light transmissive material, such as glass, silica glass, resin, and thereby, while the light source 5 is sealed from its outside, the light from the light source 5 will be emitted from the transparent plate 9. Moreover, it is preferable that the inner wall of the concave structure of the housing 8 is formed as a light reflector 10, and the light from the light source 5 is efficiently emitted from the transparent plate 9 to its exterior. The supplying of electric power to the light source 5 may be done by a power line 11 penetrated through the housing 8 while being sealed.

Then, the light source device 4 as described above is placed in the water W in the container portion 2, as shown in FIG. 1A, where the waste heat of the light source is transmitted to the water through the housing 8 so that the water will be warmed, and thereby the improvement of the efficiency of hydrogen gas production is achieved. In this respect, as noted in the column of "SUMMARY", according to the research of the inventors of the present embodiment, the rising of the efficiency of the hydrogen gas production by a photocatalyst caused by the water temperature increase has been found out by an experiment as follows:

In the experiment, a photocatalyst member obtained by spreading and sintering 100 mg $SrTiO_3$ (strontium titanate) on a glass plate was immersed in 200 ml of water put in a container made of silica glass, and while adjusting the water temperature to various values with a heater, the light of 365 nm was irradiated to the photocatalyst member at various light intensities by LED (maximum output 0.691 W) of a spot type, whereby the decomposition reaction of water was induced, and hydrogen gas generated therefrom was collected and the generated amount of hydrogen gas was measured. The area irradiated with the light was 2 $cm^2$. The output of the LED (irradiation light intensity) was adjusted while being measured by means of a power meter (Ophir Japan 50(150)A-BB26). Then, the light amount (incident light amount) of the irradiated light to the photocatalyst was computed by the following: Incident light amount (mmol $cm^{-2} \cdot hr^{-1}$)=$P \times \lambda \times 3600/(A \cdot h \cdot c)$, where P is the LED output (W·$cm^{-2}$); $\lambda$ is the wavelength=365 (nm); A is the Avogadro's number ($mol^{-1}$); h is the Planck constant (J·s); and c is the velocity of light (m·$s^{-1}$). Then, the efficiency of hydrogen gas production (photocatalyst efficiency) was computed by the following:

[Photocatalyst efficiency (%)]=[the generated amount of hydrogen gas $H_2$]×2/[incident light amount], where the unit of the generated amount of hydrogen gas is mmol·$cm^{-2} \cdot hr^{-1}$. (The reduced amount of hydrogen ions is twice of hydrogen gas.).

Figure 3A:
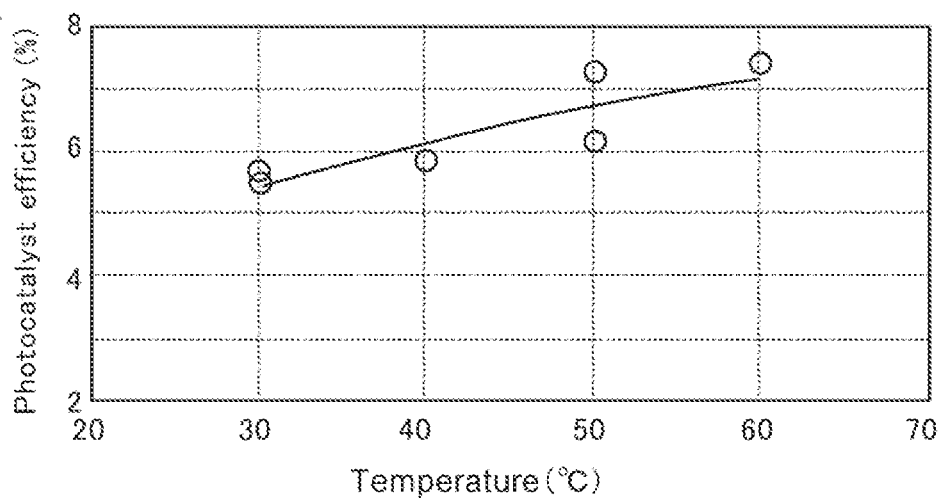

In the results, referring to FIG. 3A, when the water temperature was increased to 30° C., 40° C., 50° C., and 60° C., while the LED output was maintained to its maximum output, the photocatalyst efficiency increased with the rise of the water temperature. This is considered because the reaction velocity of electrons and water by the photocatalyst was increased by the heating. Thus, it was confirmed that the efficiency of hydrogen gas production by a photocatalyst was improved by the rise of the water temperature.

Figure 3B:
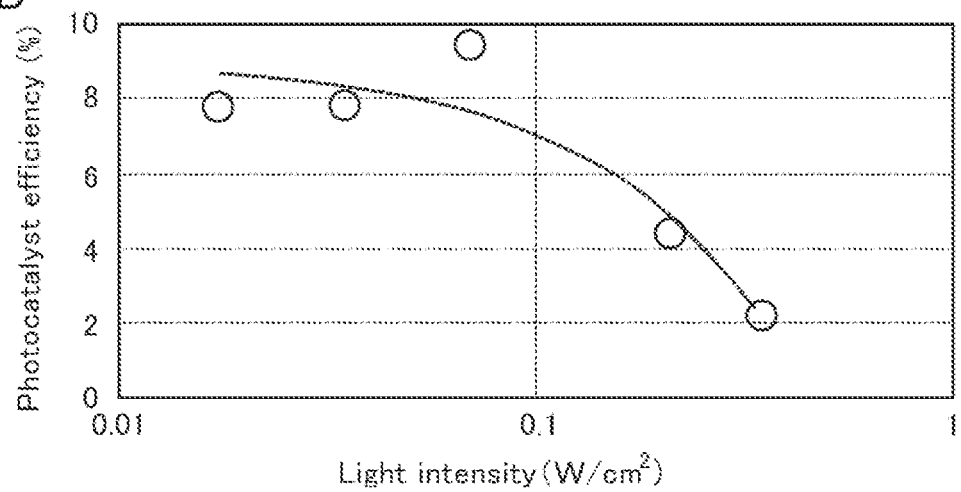

Further, the density of the light emitted from the above-mentioned light source device 4 may be adjusted so that the efficiency of hydrogen gas production will be improved. More in detail, according to the research of the inventors of the present embodiment, as already noted, it is found that the efficiency of hydrogen gas production (the produced amount of hydrogen gas per incident light amount) decreases as the density of the light irradiated to a photocatalyst is increased. Referring to FIG. 3B, according to experiments under the same conditions as FIG. 3A, when the water temperature was 25° C. (room temperature) and the LED output was changed to 5% 10%, 20%, 60%, and 100% of the maximum output, the photocatalyst efficiency decreased with the increase of the LED output, i.e., the density of the irradiated light. This is considered because, even when the densities of excited electrons and electron holes generated in the photocatalyst are increased by the light intensity increase, the excited electrons and electron holes disappear by their recombination before reacting to water due to the slow speed of the decomposition reaction of water with excited electrons and electron holes. That is, it has been shown that the ratio of photon energy which contributes to the generating of hydrogen gas decreases when the density of the light irradiated to the photocatalyst is increased. And concretely, referring to FIG. 3B, it is understood that the change of the efficiency of hydrogen gas production is gradual if the light intensity is in the range below 0.1 W/cm$^2$. However, since the absolute amount of the photocatalytic reaction reduces as the light intensity is lower, it is preferable that the density of the light from the light source device 4 is adjusted to about 0.1 W/cm$^2$ or somewhat fewer than it in order to obtain more hydrogen gas. For instance, the area A cm$^2$ irradiated with the light from the light source device 4 may be adjusted to be $P_L/0.1$ when the optical power from the light source device 4 is $P_L$ (W) so that the light intensity making the photocatalyst efficiency high will become 0.1 W/cm$^2$ or below. The area irradiated with light may be adjusted by adjusting the direction of a light reflector.

And, further, in the above-mentioned light source device 4 which is sunk in the water, the coat 12 of a photocatalyst material is applied on the outside surface of the housing 8. According to the research of the inventors of the present embodiment, when the light source device 4 was sunk in the water without the photocatalyst material coat 12, the material of the outside surface of the housing 8 was dissolved and the deterioration of the surface was observed. Especially, when ultrapure water (electric resistivity≥15M Ω–cm) was used for the water, the dissolution and deterioration occurred notably when the surface of the housing 8 was metal. By the way, as schematically drawn in FIG. 1A, the light L from the light source device 4 penetrates the transparent plate 9 and propagates in the water W, and since the light is scattered in the water and reflected on a liquid surface and an inner surface of the container portion, the light propagates in various directions in the water as drawn by dotted arrows in the drawing, and the light which has penetrated the transparent plate 9 repeats the scattering and reflection and reaches also to the surface of the housing 8 at not small amount. So, if a photocatalytic reaction occurs also on the surface of the housing 8, the improvement of the efficiency of hydrogen gas production is expected. Then, in this embodiment, for the prevention of dissolution of the material and deterioration on the surface of the housing 8 and the improvement in the efficiency of hydrogen gas production, the surface of the housing 8 may be coated with the photocatalyst material 12 as noted above. The photocatalyst material coated on the surface of the housing 8 may be the same material as the photocatalyst bodies 3, and may be different photocatalyst materials. However, it is preferable that the photocatalyst material on the surface of the housing 8 is also a material having a sufficient activity to the light of the wavelength of the light from the light source.

In the above-mentioned structure, in order that as much amount as possible of light from the light source device 4 is irradiated to and absorbed by the photocatalyst bodies 3 and the photocatalytic coat 12 in the container portion 2, the container portion 2 may be provided with a structure for confining the light in the container portion 2 in order not to leak the light to the exterior thereof. For instance, the inner wall of the container portion 2 may be covered with a reflective mirror which reflects the light (light reflecting mechanism).

Figure 4:
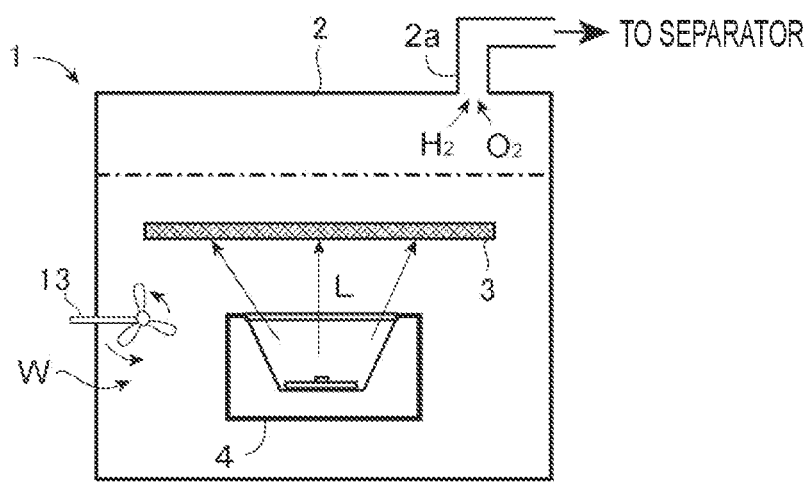
FIG. 4 is a schematic drawing of another type of a hydrogen gas producing apparatus according to the present embodiment.

In the hydrogen gas producing apparatus 1 of the present embodiment, there may be employed a plate member with photocatalyst material for a photocatalyst body 3 as schematically drawn in FIG. 4. In that case, typically, the photocatalyst body 3 may be formed in plate as illustrated, but, not limited thereto, when the photocatalyst material can be in contact with the water W. For instance, in one manner, the photocatalyst body 3 may be formed by fixing a photocatalyst material on a substrate through overlaying powder of a photocatalyst material on a glass substrate or a ceramic board overall and heating to sinter it, or a substrate formed by hardening photocatalyst material in a plate form may be employed as the photocatalyst body 3. Further, for instance, there may be provided a stirring means 13 for generating convection of the water W in the container portion 2. Furthermore, when a plate member is employed as the photocatalyst body 3, particulate photocatalyst bodies 3 consisting of photocatalyst material may also be dispersed in the water to contribute the production of hydrogen gas.

Figure 5A:
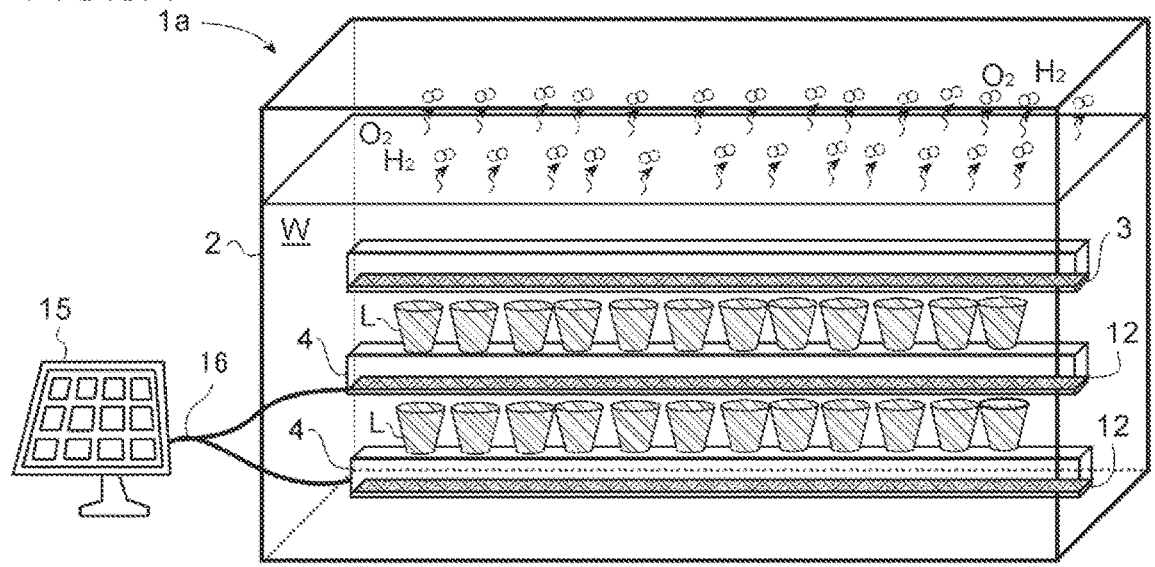
FIG. 5A is a schematic drawing of yet another type of a hydrogen gas producing apparatus according to the present embodiment.
Figure 5B:
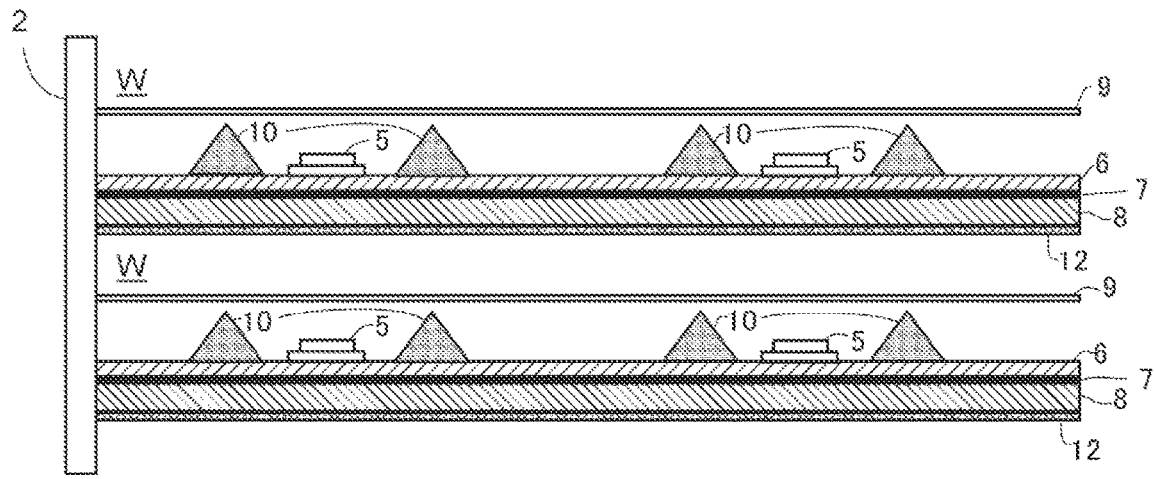
FIG. 5B is a typical side view of a light source device thereof.

Moreover, in the hydrogen gas producing apparatus 1 of the present embodiment, as schematically drawn in FIG. 5A, a light source device 4 in which two or more light sources emitting light L are aligned is sunk in the water W in the container portion 2, and a plurality of such light source devices 4 may be arranged in the water. In these light source devices 4, as schematically drawn on FIG. 5B, two or more light sources 5, which may be LEDs, are arranged on the housing 8 via a printed circuit board 6 and a heat conduction sheet 7, and around the respective light sources 5, there may be set light reflectors 10 collecting the light emitted from the light sources 5, and a transparent plate 9 is placed above each light source 5, whereby the light L from the light sources 5 may propagate into the water W through the transparent plates 9. Then, the outer surface of the housing 8 may be coated with the photocatalyst material 12. According to this structure, as shown in FIG. 5A, the light L emitted from one light source device 4 will be irradiated to the surface, coated with the photocatalyst material 12, of the housing 8 of another light source device 4, whereby the decomposition reaction of water by the photocatalyst occurs so that hydrogen gas can be produced.

The light source device(s) 4 of the device 1 of the present embodiment is(are) operated by electric power, and preferably, that electric power may be given from energy of sunlight origin, which is generated in a solar panel, etc., or other renewable energy. For this, as shown in FIG. 5A, the light source device(s) 4 may be designed to receive the supply of electric power through power lines 16 from a power production source by renewable energy, such as a solar panel 15.

The Operation of the Hydrogen Gas Producing Apparatus

In the operation of the hydrogen gas producing apparatus 1 of the present embodiment, the light source device 4 emits light by receiving the supply of electric power from a power production source such as the solar panel 5, and the light is irradiated to the photocatalyst bodies 3 in the container portion 2. Further, the water W in the container portion 2 is warmed by the waste heat of the light source device 4. Then, in the photocatalyst material, the light is absorbed; excited electrons and electron holes are generated; hydrogen of the water is reduced by the excited electrons so that hydrogen gas will be formed, while oxygen of the water is oxidized by the electron holes so that oxygen gas will be formed. And then, the generated hydrogen gas and oxygen gas pass through the gas pipe 2a, and are sent to a separator (not shown), where the hydrogen gas will be separated and collected. The separator may be, for instance, an arbitrary separator using a hydrogen separating membrane being used in this field.

Output Control of a Light Source Device

As noted, in the hydrogen gas producing apparatus 1 of the present embodiment, the electric power supplied to the light source device 4 may be that of renewable energy origin, such as from the solar panel 15. In accordance with the use of the light emitted from a light source device by the electric power converted from solar energy for the light to be irradiated to a photocatalyst, instead of the direct use of the sunlight, it is possible to convert the wavelength of the light into a wavelength band of light well absorbed by the photocatalyst and condense the density of the light, and thereby, the space occupied by the photocatalyst can be made small and the hydrogen gas producing apparatus can easily be miniaturized.

By the way, it is found that, when the light irradiated to a photocatalyst is obtained by supplying electric power to the light source device 4 to make a light emitting element or a light-emitting object emit the light, the light-emitting efficiency of the light emitting element or light-emitting object, such as LED, changes depending upon the current amount supplied thereto. According to the experiments of the inventors of the present embodiment, as illustrated in FIG. 6A, when the light-emitting efficiency (%) to the inputted current was measured in the condition that four LEDs having the rated current of 1 A and the rated voltage of 3.54V were connected in parallel, the condition giving the maximum light-emitting efficiency was when the inputted current was a value (1.6 A) lower than the rated current as illustrated. Namely, this indicates that, when a light emitting element or a light-emitting object is supplied with a current more than the current giving the maximum light-emitting efficiency, the ratio of energy which is not converted into light increases relatively, leading to the increase of energy loss. Thus, in the present embodiment, it is preferable that the current supplied to the light source device 4 is adjusted so that the light-emitting efficiency of the light emitting element or light-emitting object will be maximized. Or, in the current supplied to the light source device 4, the current amount in the light emitting element or light-emitting object may be adjusted so that the light-emitting efficiency will be maximized. Concretely, there may be selected a light emitting element or a light-emitting object of a rated output through which the current giving the maximum light-emitting efficiency flows when the current which can be inputted to the light source device 4 is inputted. Thus, for instance, in a case of using a solar panel for the electric power source which supplies electric power to the light source device 4, preferably, a light emitting element or a light-emitting object is chosen so that the maximum light-emitting efficiency will be given when the current at the rated current value of the solar panel flows through it.

Moreover, when a power production source by renewable energy, such as a solar panel, is used as an electric power source which supplies electric power to the light source device 4, the output of the power production source varies depending upon its environmental conditions, such as the sunshine condition, and thus, the available current can vary every moment. In that case, if the light source device operates in the condition that the light-emitting efficiency becomes maximized every moment, the good efficiency of the energy used for the production of hydrogen gas will be obtained. For one way for that, in the light source device 4 of the present embodiment, there may be employed a structure that two or more LEDs are connected in parallel as light emitting elements or light-emitting objects, as drawn in FIG. 7A-FIG. 7C. In this structure, the number of LEDs connected to the power production source is adjusted in accordance with the output of the power production source, and thereby it will be configured that the current giving the maximum light-emitting efficiency as always as possible flows in the LEDs connected to the power production source. For instance, when the output of the power production source is its rated power, all of the LEDs may be connected to the power production source PV, as in FIG. 7A; when the output of the power production source becomes about a half of its rated power, a half of LEDs may be connected to the power production source PV, as in FIG. 7B; and when the output of the power production source becomes about ¼ of its rated power, ¼ of LEDs may be connected to the power production source PV, as shown in FIG. 7C. Thereby, as illustrated in FIG. 6B, it becomes possible to achieve the condition that the current giving the maximum light-emitting efficiency flows through each LED being connected to the power production source PV. Namely, by adjusting the number of LEDs connected to a power production source according to the output of the power production source, the light-emitting efficiency in each of LEDs receiving current from the power production source will be as close to the maximum as possible, and it becomes possible to suppress energy which does not contribute to the generating of the light.

As an example, in a case that the electric power inputted to a LED is 5.664 W (current 1.6 A at 3.54V), if the light-emitting efficiency of the LED is 32%, the light-emitting output becomes 1.84 W. In that case, since the radiated light density in the photocatalyst bodies 3 is to be about 0.1 $W/cm^2$ giving the high photocatalyst efficiency, it is preferable to adjust the irradiation area to be about 18.4 $cm^2$. To satisfy this condition, the position and direction of a light reflector and the interval of LEDs being placed may be set.

Although the above explanation has been described with respect to embodiments of the present invention, it will be apparent for those skilled in the art that various modifications and changes are possible, and that the present invention is not limited to the above-illustrated embodiments and may be applied to various devices and apparatus without deviating from the concepts of the present invention.

The invention claimed is:
1. A hydrogen gas producing apparatus, comprising:
   a container portion which receives water;

a photocatalyst body, dispersed or placed in the water in the container portion, which has a photocatalyst material, which, when it is irradiated with light, generates excited electrons and electron holes, causing a water decomposition reaction in which water is decomposed into hydrogen and oxygen thereby generating hydrogen gas;

a light source emitting light which is irradiated to the photocatalyst body and causes the water decomposition reaction; and a housing carrying the light source;

wherein the housing is placed in the water in the container portion so that the water is warmed by waste heat of the light source discharged from the surface of the housing, and the surface of the housing in contact with the water is coated with a photocatalyst material.

2. The apparatus of claim 1, wherein the light emitted from the light source is irradiated also to the photocatalyst material coated on the housing surface.

3. The apparatus of claim 2, wherein a plurality of light sources and housings carrying the respective light sources are placed in the water in the container portion, and the light emitted from one of the light sources is irradiated also to the photocatalyst material coated on a surface of a housing of another of the light sources.

4. The apparatus of claim 2, being configured to confine the light emitted from the light source within the container portion.

5. The apparatus of claim 4, wherein the container portion has a light reflecting mechanism for confining the light emitted from the light source in the container portion.

6. The apparatus of claim 1, wherein a density of the light irradiated to the photocatalyst body is adjusted to or lower than a density giving a photocatalyst efficiency, which is a ratio of a generated amount of hydrogen gas per an amount of photons entering into the photocatalyst material, being at or more than a predetermined value.

7. The apparatus of claim 1, wherein the light source is operated by electric power obtained by solar power generation to emit the light to be irradiated to the photocatalyst body, and waste heat of the light source in its operation is transmitted to water in contact with the housing.

8. The apparatus of claim 7, wherein a rated power of the light source is adjusted such that a light-emitting efficiency of the light source will be maximized when a current at a rated current value of the solar power generation is supplied to the light source.

9. The apparatus of claim 7, wherein the light source comprises two or more LEDs, and the number of operating LEDs in the two or more LEDs varies so that a light-emitting efficiency of the light source will be maximized in accordance with an output current of the solar power generation.

10. The apparatus of claim 1, wherein an emission wavelength of the light source is chosen to fall in a wavelength band in which a quantum yield of the photocatalytic material exceeds a predetermined threshold value.

\* \* \* \* \*